United States Patent
Lee et al.

(10) Patent No.: US 12,230,186 B2
(45) Date of Patent: Feb. 18, 2025

(54) PIXEL DRIVING CIRCUIT CAPABLE OF OPERATING IN LOW-DEFINITION MODE AND HIGH-DEFINITION MODE USING SAME PIXEL MEMORY, AND DISPLAY DEVICE COMPRISING SAME

(71) Applicant: SAPIEN SEMICONDUCTORS INC., Ulsan (KR)

(72) Inventors: Jae Hoon Lee, Busan (KR); Jin Woong Jang, Suwon-si (KR)

(73) Assignee: SAPIEN Semiconductors Inc., Gyeonggi-do (KR)

( * ) Notice: Subject to any disclaimer, the term of this patent is extended or adjusted under 35 U.S.C. 154(b) by 0 days.

(21) Appl. No.: 17/916,347

(22) PCT Filed: Oct. 22, 2020

(86) PCT No.: PCT/KR2020/014482
§ 371 (c)(1),
(2) Date: Sep. 30, 2022

(87) PCT Pub. No.: WO2021/201361
PCT Pub. Date: Oct. 7, 2021

(65) Prior Publication Data
US 2023/0154387 A1  May 18, 2023

(30) Foreign Application Priority Data

Apr. 2, 2020  (KR) .................. 10-2020-0040501

(51) Int. Cl.
| G09G 3/32 | (2016.01) |
| G06F 1/16 | (2006.01) |
| G02B 27/01 | (2006.01) |

(52) U.S. Cl.
CPC ............... *G09G 3/32* (2013.01); *G06F 1/163* (2013.01); *G02B 27/017* (2013.01);
(Continued)

(58) Field of Classification Search
CPC ...... G09G 3/32; G09G 3/3208; G09G 3/3225; G09G 3/3233; G09G 3/3241;
(Continued)

(56) References Cited

U.S. PATENT DOCUMENTS

| 7,336,251 B2 * | 2/2008 | Osada | ............... G09G 3/3241 |
| | | | 345/82 |
| 8,659,521 B2 * | 2/2014 | Osame | ............... G09G 3/2022 |
| | | | 345/82 |

(Continued)

FOREIGN PATENT DOCUMENTS

| JP | 2011-232764 A | 11/2011 |
| KR | 10-2008-0052406 A | 6/2008 |
| KR | 10-2008-0070045 A | 7/2008 |
| KR | 10-2015-0101505 A | 9/2015 |
| KR | 10-2017-0079408 A | 7/2017 |
| KR | 10-2017-0111788 A | 10/2017 |
| KR | 10-2156270 B1 | 9/2020 |

OTHER PUBLICATIONS

International Search Report for PCT/KR2020/014482, dated Jan. 26, 2021.

*Primary Examiner* — Jason M Mandeville (57) ABSTRACT

Provided is a pixel driving circuit operatable in a low-definition mode and a high-definition mode using the same pixel memory, and a display device including the same. The pixel driving circuit may include a driving line configured to connect between an emitter and a positive power source or between the emitter and a negative power source, a first transistor connected in series on the driving line and turned on in response to a pulse width modulation (PWM) signal, a first driving unit and a second driving unit that are connected in series on the driving line and electrically connected in parallel to each other, and a second transistor connected between a reference voltage source, which is connected to apply a reference voltage to the first driving unit and the second driving unit, and the second driving unit and turned on or off in response to a display mode selection signal.

7 Claims, 9 Drawing Sheets

(52) U.S. Cl.
CPC ............... *G02B 2027/0178* (2013.01); *G09G 2300/0857* (2013.01); *G09G 2310/0272* (2013.01); *G09G 2310/08* (2013.01); *G09G 2330/021* (2013.01); *G09G 2340/04* (2013.01)

(58) Field of Classification Search
CPC ...... G09G 3/3275; G09G 3/3688; G09G 3/20; G09G 3/2022; G09G 3/2081; G09G 2300/0857; G09G 2310/0272; G09G 2310/08; G09G 2330/021; G09G 2340/04; G09G 2320/0653; G06F 1/163; G06F 1/3265; G02B 27/017; G02B 2027/0178
USPC .......................................................... 345/55
See application file for complete search history.

(56) References Cited

U.S. PATENT DOCUMENTS

| | | | | |
|---|---|---|---|---|
| 2004/0263440 | A1* | 12/2004 | Kimura | G09G 3/2011 345/76 |
| 2007/0080905 | A1* | 4/2007 | Takahara | G09G 3/3258 345/76 |
| 2017/0200415 | A1* | 7/2017 | Noguchi | H10K 50/11 |
| 2021/0056902 | A1* | 2/2021 | Tanaka | G09G 3/3291 |
| 2022/0392402 | A1* | 12/2022 | Ueda | G09G 3/325 |

* cited by examiner

PIXEL DRIVING CIRCUIT CAPABLE OF OPERATING IN LOW-DEFINITION MODE AND HIGH-DEFINITION MODE USING SAME PIXEL MEMORY, AND DISPLAY DEVICE COMPRISING SAME

CROSS REFERENCE TO RELATED APPLICATIONS

This application is a National Stage of International Application No. PCT/KR2020/014482 filed Oct. 22, 2020, claiming priority based on Korean Patent Application No. 10-2020-0040501 filed Apr. 2, 2020.

TECHNICAL FIELD

The present disclosure relates to a display, and more particularly, to a display device capable of operating in a low-definition mode and a high-definition mode using the same pixel memory.

BACKGROUND ART

Active matrix liquid crystal displays maintain a state in which light is emitted while information of all other pixels is being updated. In the case of a digital method in which a memory is included inside a pixel, during one frame, data related to light to be output by the pixel is stored, and luminance is controlled through a pulse width modulation (PWM) method. In general, when three or four emitters (for example, light-emitting diodes (LEDs)) are included in one pixel, each emitter is referred to as a sub-pixel.

Figure 9:
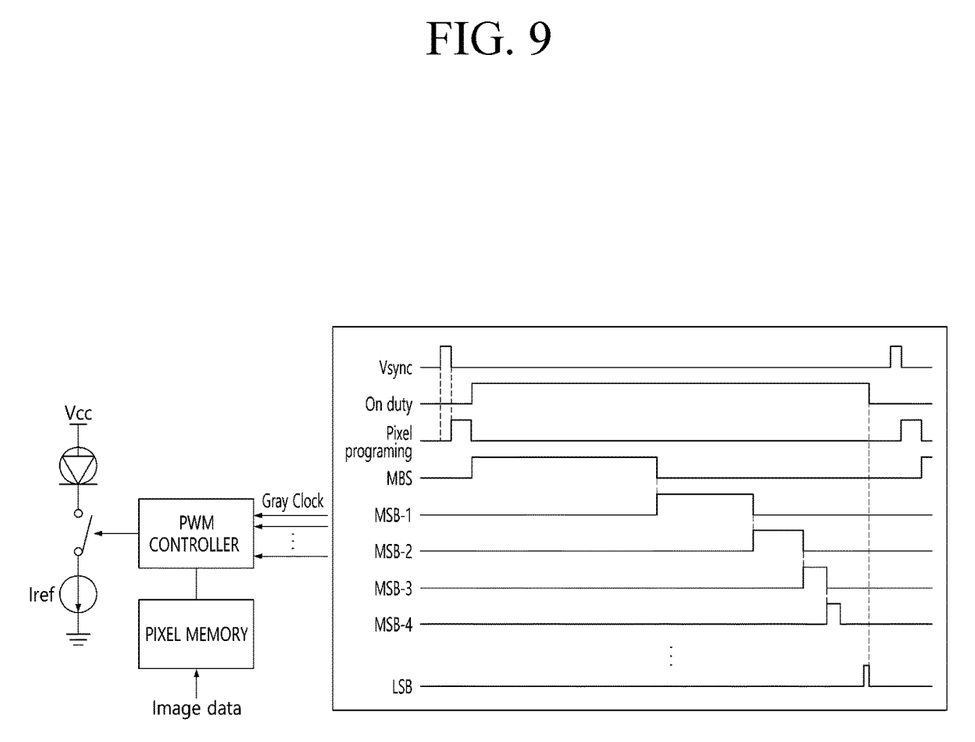
FIG. 9 is a driving circuit diagram of a sub-pixel according to the related art.

FIG. 9 is a driving circuit diagram of a sub-pixel according to the related art.

Referring to FIG. 9, a driving circuit diagram and signal timings of a sub-pixel may be confirmed. In the case of a pixel using a digital PWM driving method, image data is stored in a pixel memory during a predetermined period of time (pixel programming). In addition, according to the image data stored in the pixel memory, the sub-pixel emits light for an emission time (On duty) within one frame. In this case, luminance of the sub-pixel is controlled by a PWM method. As in an example shown in FIG. 9, gray clock signals for PWM control are input to a driving circuit of the sub-pixel. The number of gray clock signals MSB, MSB-1, MSB-2, and LSB is determined according to the number of bits of the image data. A PWM controller outputs a gray clock signal to an emitter LED according to the image data stored in an embedded pixel memory. As a result, the emitter LED emits light for the emission time (On duty) within one frame.

A color depth of a display is related to how much the emitter LED can finely adjust the emission time (On duty) for one frame. Accordingly, the color depth of the display may vary depending on the number of bits of the embedded pixel memory.

Meanwhile, a typical embedded pixel memory includes static random-access memory (SRAM) cells corresponding to the number of bits. Accordingly, as the number of SRAM memory cells increases in order to implement a high-definition display, the amount of power consumption increases, and the size of a pixel circuit also increases, and a larger amount of power and a larger-sized circuit are required in the process of data transmission for controlling the pixel circuit.

DISCLOSURE

Technical Problem

An object of the present specification is to provide a sub-pixel driving circuit capable of operating in a low-definition mode and a high-definition mode using the same pixel memory, and a display device including the same.

Objects of the present specification are not limited to the aforementioned objects and other objects not mentioned herein will be clearly understood from the following description by those skilled in the art.

Solution to Problem

One aspect of the present disclosure provides a pixel driving circuit including a driving line configured to connect between an emitter and a positive power source or between the emitter and a negative power source, a first transistor connected in series on the driving line and turned on in response to a pulse width modulation (PWM) signal, a first driving unit and a second driving unit that are connected in series on the driving line and electrically connected in parallel to each other, and a second transistor connected between a reference voltage source and the second driving unit, wherein the reference voltage source is configured to apply a reference voltage to the first driving unit and the second driving unit and wherein the second transistor is turned on or off in response to a display mode selection signal.

According to an embodiment of the present specification, the first driving unit may include a third transistor connected in series on the driving line and turned on in response to the positive power source, and a fourth transistor connected in series on the driving line and turned on in response to the reference voltage. In addition, according to an embodiment of the present specification, the second driving unit may include a fifth transistor connected in series on the driving line and turned on in response to the positive power source, and a sixth transistor connected in series on the driving line and turned on in response to the reference voltage when the second transistor is turned on.

In this case, the second transistor may be connected between the reference voltage source and the sixth transistor.

The pixel driving circuit according to the present specification may further include a seventh transistor connected between the positive power source and the sixth transistor, wherein the seventh transistor is turned on or off in response to the display mode selection signal.

According to an embodiment of the present specification, the first, fourth, sixth, and seventh transistors may be P-type metal-oxide silicon field effect transistors (MOSFETs), and the second, third, and fifth transistors may be N-type MOSFETs.

The pixel driving circuit according to the present specification may be a component of a pixel circuit including the pixel driving circuit, an emitter, a pixel memory configured to store data related to driving of the emitter, and a PWM controller configured to process a signal for controlling luminance of the emitter.

In this case, the pixel memory may include five static random-access memory (SRAM) cells for storing 5 bits of data related to the driving of the emitter.

Another aspect of the present disclosure provides a display device including a display panel including a plurality of pixel circuits, a scan driving circuit configured to sequentially drive the pixel circuits arranged in a row direction, a data driving circuit configured to provide a signal, which is related to driving of each emitter, to each pixel memory through a plurality of data lines in a column direction, a gray clock signal output circuit configured to output a gray clock signal to a PWM controller included in each pixel circuit, wherein the gray clock signal is a pulse signal whose width is adjusted to adjust luminance of a pixel, and a timing control circuit configured to output a signal for controlling the scan driving circuit, the data driving circuit, and the gray clock signal output circuit and output a display mode selection signal to a second transistor included in the plurality of pixel circuits.

According to an embodiment of the present specification, the timing control circuit may output a first mode signal that is low-definition mode or a second mode signal that is high-definition mode, and wherein the first mode signal is configured to turn on the second transistor for one frame period, wherein the second mode signal is configured to turn on second transistor for one sub-frame period and turn off the second transistor for the remaining sub-frame period, and wherein the one frame includes two sub-frames.

According to an embodiment of the present specification, the timing control circuit may output a control signal to the gray clock signal output circuit so that the gray clock signal output circuit outputs the gray clock signal for a predetermined period of time (T), in the first mode, and output the control signal to the gray clock signal output circuit so that the gray clock signal output circuit outputs the gray clock signal during ⅔T in each sub-frame period, in the second mode.

According to an embodiment of the present specification, the timing control circuit may output the control signal so that the gray clock signal output circuit outputs the gray clock signal, which satisfies $$\sum_{n=1}^{k} \frac{1}{2^n} T,$$

in the first mode, and the gray clock signal output circuit may output the gray clock signal, which satisfies $$\sum_{n=1}^{k} \frac{1}{2^{2n-1}} T,$$

in the second mode, where k is the number of pixel memory storage bits.

According to an embodiment of the present specification, the timing control circuit may output the control signal so that the data driving circuit outputs the signal related to the driving of each emitter to each pixel memory once, in the first mode, and output the control signal so that the data driving circuit outputs the signal related to the driving of each emitter to each pixel memory twice in response to each sub-frame period, in the second mode.

The display device according to the present specification may be one component of a wearable device including the display device, a first power source configured to supply power to the display device, and a communication module configured to receive an image data from a host device configured to transmit the image data and provide the image data to the timing control circuit, wherein the image data is data related to an image displayed on the display device.

In this case, the communication module may receive the image data from the host device through wireless communication. In addition, the host device may receive power from a second power source.

Other specific details of the present disclosure are included in the detailed description and drawings.

Advantageous Effects of Disclosure

According to an aspect of the present specification, it is possible to provide a display device capable of operating in a low-definition mode and a high-definition mode using the same pixel memory.

According to another aspect of the present specification, it is possible to provide a display panel having a smaller space occupied by a pixel memory as compared to a conventional display panel that provides the same definition.

According to another aspect of the present specification, it can be selectively operated only when a high-definition image is required, and thus power consumption can be reduced as compared to a conventional display panel. Accordingly, it is possible to more efficiently manage power of a wearable device that requires a display device but has limited battery capacity.

Effects of the present disclosure are not limited to the above-described effects, and other effects not described above may be clearly understood to those skilled in the art from the following descriptions.

MODE OF DISCLOSURE

Advantages and features, and methods of achieving the same of the present disclosure disclosed in the present specification will be more clearly understood from embodiments described below with reference to the accompanying drawings. However, the present specification is not limited to the embodiments to be disclosed below but may be implemented in various different forms. The present embodiments are provided only to complete the present specification and to fully provide a person having ordinary skill in the art (hereinafter those skilled in the art) to which the present specification pertains with the category of the present specification, and the scope of the present specification will be defined by the appended claims.

The terms used in the present specification are for describing the embodiments but are not intended to limit the scope of the present specification. As used herein, the singular forms are intended to include the plural forms as well, unless the context clearly indicates otherwise. It will be understood that the terms "comprise" or "comprising" when used herein, specify some stated components, but do not preclude the presence or addition of one or more other components.

The same reference number refers to the same component in the drawings throughout the specification, and the term "and/or" includes any and all combinations of one or more of the associated listed components. Although the terms "first," "second," and the like may be used to describe various components, these components should not be limited by these terms. These terms are only used to distinguish one component from another component. Therefore, a first component described below may be a second component within the technical scope of the present disclosure.

Unless otherwise defined, all terms (including technical and scientific terms) used in the present specification may be used in a sense commonly understood by those skilled in the art to which the present specification pertains. In addition, it will be understood that terms, such as those defined in commonly used dictionaries, will not be interpreted in an idealized or overly formal sense unless expressly so defined herein.

In the following embodiments, the term "on" used in connection with an element state may refer to an activated state of an element, and the term "off" used in connection with the element state may refer to a deactivated state of the element. The term "on" used in connection with a signal received by the element may refer to a signal that activates the element, and the term "off" used in connection with the signal received by the element may refer to a signal that deactivates the element. The element may be activated by a high voltage or a low voltage. For example, a P-type transistor is activated by a low voltage, and an N-type transistor is activated by a high voltage. Thus, it should be understood that an "on" voltage of the P-type transistor has an opposite (low to high) voltage level with respect to an "on" voltage of the N-type transistor.

It will be understood that when an element is referred to as being "connected to," or "coupled to" another element, it can be directly connected to or coupled to another element or intervening elements may be present. In contrast, when an element is referred to as being "directly connected to" or "directly coupled to" another element, there are no intervening elements. Hereinafter, embodiments of the present disclosure will be described in detail with reference to the accompanying drawings.

Figure 1:
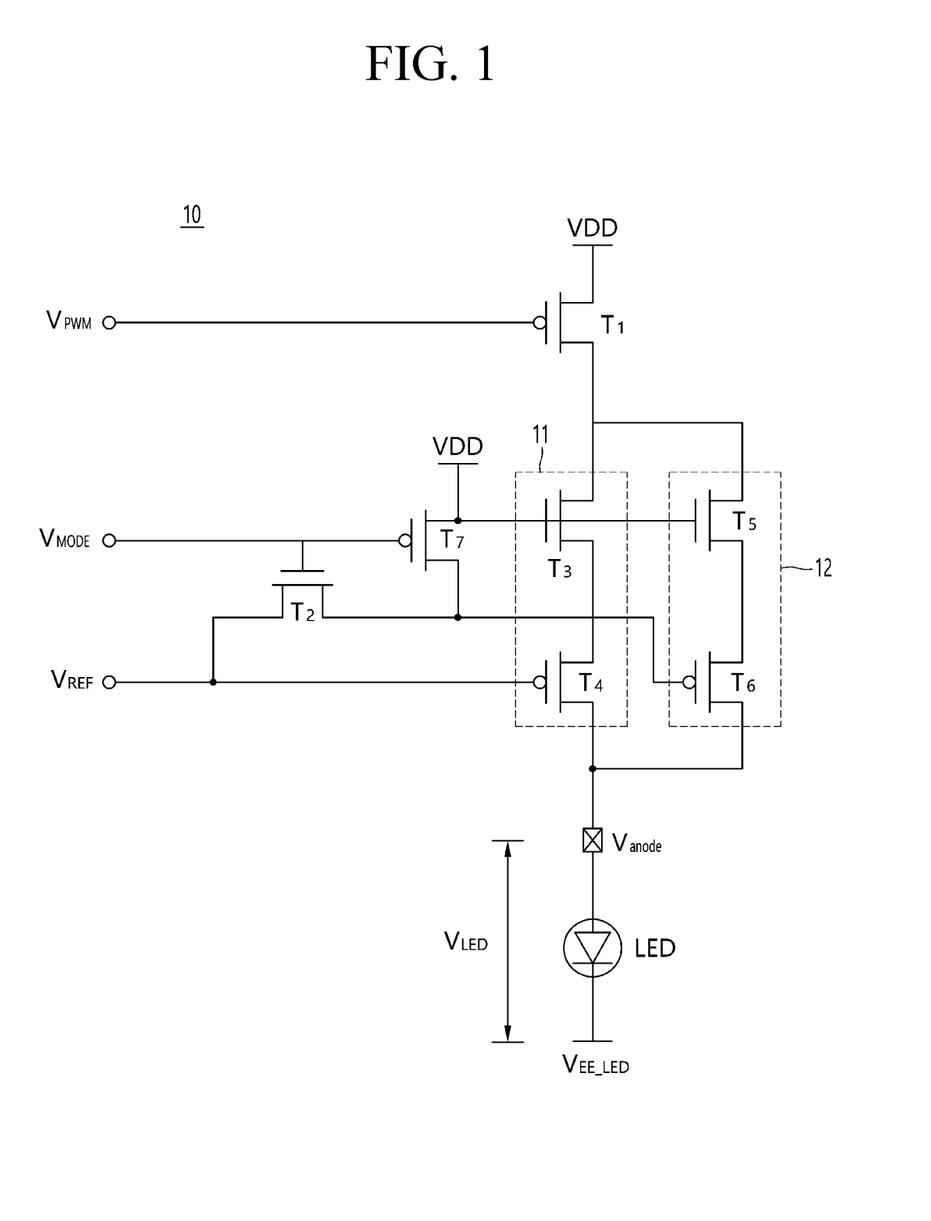
FIG. 1 is a circuit diagram of a sub-pixel driving circuit according to an embodiment of the present specification.

FIG. 1 is a circuit diagram of a sub-pixel driving circuit according to an embodiment of the present specification.

Referring to FIG. 1, an emitter LED may be confirmed. In general, when three or four emitters (for example, light-emitting diodes (LEDs)) are included in one pixel, each emitter is referred to as a sub-pixel. A sub-pixel driving circuit 10 according to the present specification is a circuit for operating the emitter LED. The sub-pixel driving circuit 10 according to the present specification may include a driving line connecting between the emitter LED and a positive power source VDD or between the emitter LED and a negative power source VEE. In an embodiment illustrated in FIG. 1, the driving line is illustrated as connecting between the emitter LED and the positive power source VDD in the sub-pixel driving circuit 10.

The sub-pixel driving circuit 10 according to the present specification may include a first transistor $T_1$, a first driving unit 11, a second driving unit 12, and a second transistor $T_2$. The first transistor $T_1$ may be connected in series on the driving line, and may be turned on in response to a pulse width modulation (PWM) signal. The first driving unit 11 and the second driving unit 12 are each connected in series on the driving line, and may be electrically connected in parallel with each other. The second transistor $T_2$ may be connected between a reference voltage source (not shown) and the second driving unit 12, and may be turned on or off in response to a display mode selection signal $V_{MODE}$. The reference voltage source may be connected to apply a reference voltage $V_{REF}$ to the first driving unit 11 and the second driving unit 12.

According to an embodiment of the present specification, the first driving unit 11 may include a third transistor $T_3$ and a fourth transistor $T_4$. The third transistor $T_3$ may be connected in series on the driving line, and may be turned on in response to the positive power source VDD. The fourth transistor $T_4$ may be connected in series on the driving line, and may be turned on in response to the reference voltage. Meanwhile, the reference voltage $V_{REF}$ may have a value of voltage that is applied to a gate terminal of the fourth transistor $T_4$ so that the fourth transistor $T_4$ is turned on.

According to an embodiment of the present specification, the second driving unit 12 may include a fifth transistor $T_5$ and a sixth transistor $T_6$. The fifth transistor $T_5$ may be connected in series on the driving line, and may be turned on in response to the positive power source VDD. The sixth transistor $T_6$ may be connected in series on the driving line, and may be turned on in response to the reference voltage $V_{REF}$ when the second transistor $T_2$ is turned on. At this point, the second transistor $T_2$ may be connected between the reference voltage source and the sixth transistor $T_6$. Meanwhile, the reference voltage $V_{REF}$ may have a value of voltage that is applied to a gate terminal of the sixth transistor $T_6$ so that the sixth transistor $T_6$ is turned on.

The sub-pixel driving circuit 10 according to an embodiment of the present specification may further include a seventh transistor $T_7$. The seventh transistor $T_7$ may be connected between the positive power source VDD and the sixth transistor $T_6$, and may be turned on or off in response to the display mode selection signal $V_{MODE}$.

In order to aid understanding of the operation of the sub-pixel driving circuit 10 according to an embodiment of the present specification in more detail, a description will be made based on an embodiment in which the first transistor $T_1$, the fourth transistor $T_4$, the sixth transistor $T_6$, and the seventh transistor $T_7$ are P-type metal-oxide silicon field effect transistors (MOSFETs), and the second transistor $T_2$, the third transistor $T_3$, and the fifth transistor $T_5$ are N-type MOSFETs.

As will be described in more detail below, the sub-pixel driving circuit 10 according to the present specification may operate in two modes. A first mode is a "standard-definition mode," and a second mode is a "high-definition mode." The standard-definition mode is a mode that operates when displaying a relatively low-definition screen as compared to the high-definition mode. In the first mode, a logic high signal may be input as the display mode selection signal $V_{MODE}$, and in the second mode, a logic high signal and a logic low signal may be input as the display mode selection signal $V_{MODE}$.

Figure 2:
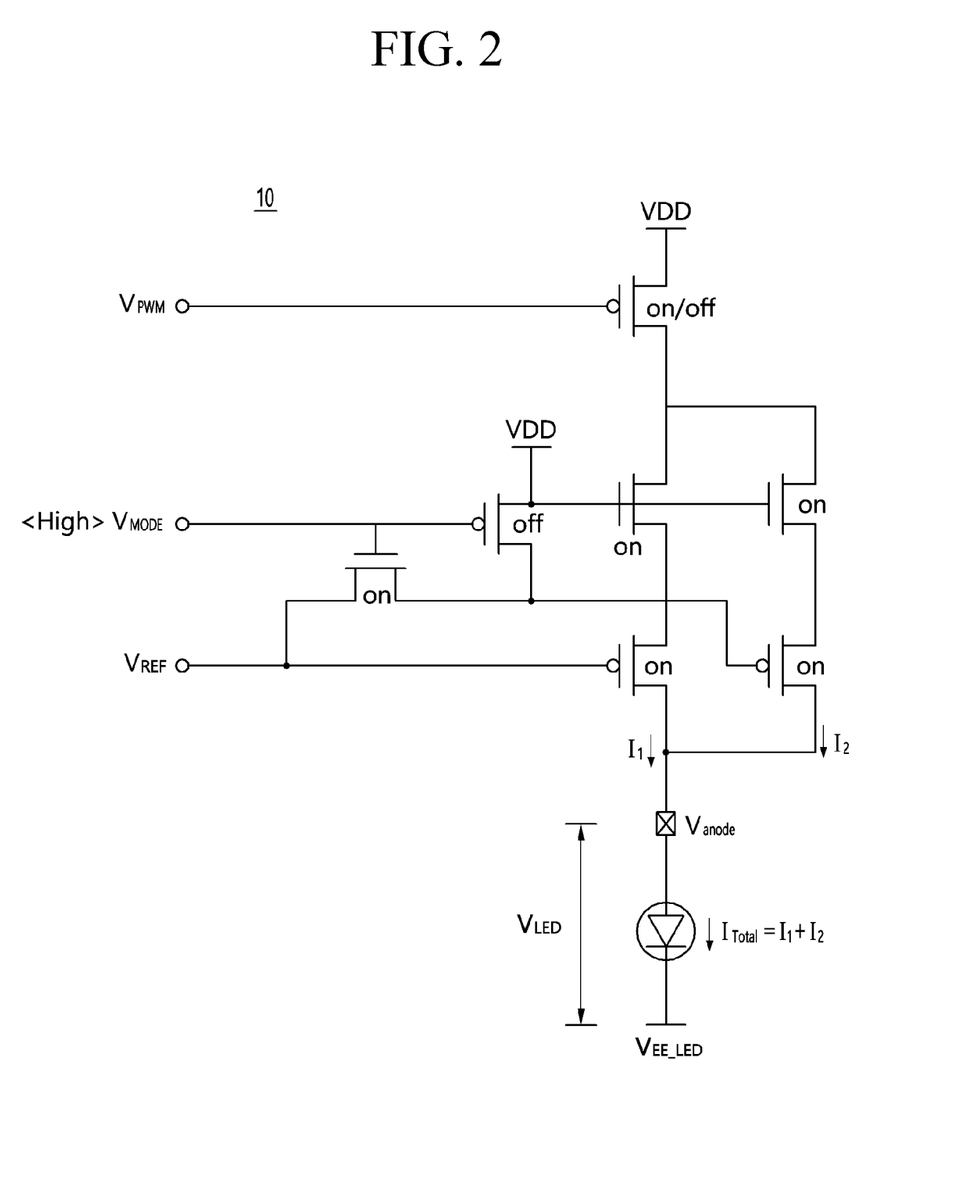
FIG. 2 is a reference diagram of a circuit operation when a display mode selection signal is at logic high.

First, a case in which a logic high is input as the display mode selection signal $V_{MODE}$ will be described. FIG. 2 is a reference diagram of a circuit operation when the display mode selection signal is at logic high. The first transistor $T_1$ may be turned on or off when a PWM signal $V_{PWM}$ is at logic high or logic low. The second transistor $T_2$ is in a turned-on state since the display mode selection signal $V_{MODE}$ is at logic high. Since a gate terminal of the third transistor $T_3$ is connected to the positive power source VDD, the third transistor $T_3$ is in a turned-on state due to the positive power source VDD. Since the reference voltage $V_{REF}$ is applied to the gate terminal of the fourth transistor $T_4$, the fourth transistor $T_4$ is in a turned-on state due to the reference voltage. Since a gate terminal of the fifth transistor $T_5$ is connected to the positive power source VDD, the fifth transistor $T_5$ is in a turned-on state due to the positive power source VDD. Since the gate terminal of the sixth transistor $T_6$ is connected to the second transistor $T_2$ and the second transistor $T_2$ is in a turned-on state, the reference voltage $V_{REF}$ is applied to the gate terminal of the sixth transistor $T_6$, and thus the sixth transistor $T_6$ is in a turned-on state. The seventh transistor $T_7$ is in a turned-off state since the display mode selection signal $V_{MODE}$ is at logic high. In summary, the third transistor $T_3$, the fourth transistor $T_4$, the fifth transistor $T_5$, and the sixth transistor $T_6$ are all in a turned-on state Accordingly, a driving current flows through both the first driving unit 11 and the second driving unit 12. When the current flowing through the first driving unit 11 is referred to as "$I_1$," and the current flowing through the second driving unit 12 is referred to as "$I_2$," the current applied to the emitter LED becomes "$I_{Total}=I_1+I_2$."

Figure 3:
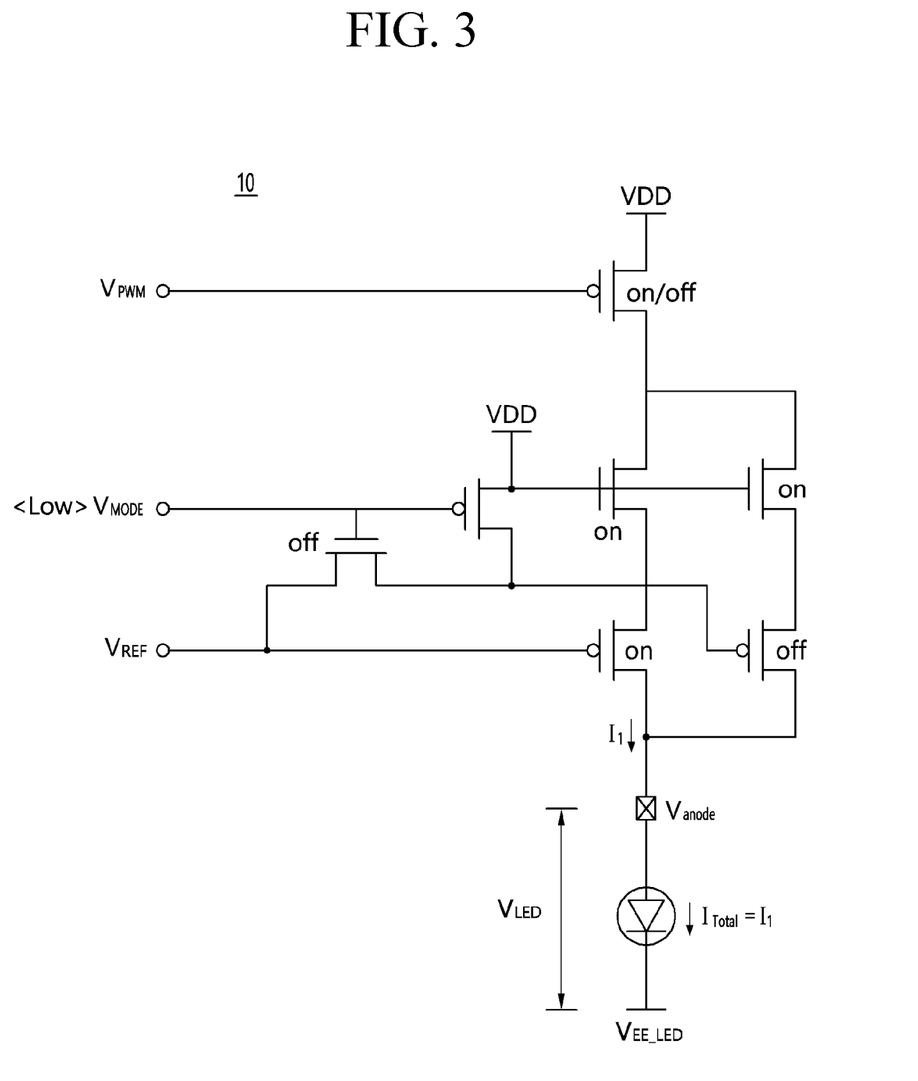
FIG. 3 is a reference diagram of a circuit operation when the display mode selection signal is at logic low.

Next, a case in which a logic low is input as the display mode selection signal $V_{MODE}$ will be described. FIG. 3 is a reference diagram of a circuit operation when the display mode selection signal is at logic low. The first transistor $T_1$ may be turned on or off when the PWM signal $V_{PWM}$ is at logic high or logic low. The second transistor $T_2$ is in a turned-off state since the display mode selection signal $V_{MODE}$ is at logic low. Since the gate terminal of the third transistor $T_3$ is connected to the positive power source VDD, the third transistor $T_3$ is in a turned-on state due to the positive power source VDD. Since the reference voltage $V_{REF}$ is applied to the gate terminal of the fourth transistor $T_4$, the fourth transistor $T_4$ is in a turned-on state due to the reference voltage. Since the gate terminal of the fifth transistor $T_5$ is connected to the positive power source VDD, the fifth transistor $T_5$ is in a turned-on state due to the positive power source VDD. Since the gate terminal of the sixth transistor $T_6$ is connected to the second transistor $T_2$ and the second transistor $T_2$ is in a turned-off state, the reference voltage $V_{REF}$ is not applied to the gate terminal of the sixth transistor $T_6$, and thus the sixth transistor $T_6$ is in a turned-off state. The seventh transistor $T_7$ is in a turned-on state since the display mode selection signal $V_{MODE}$ is at logic low. Due to the on-state of the seventh transistor $T_7$, the positive power source VDD may be applied to the gate terminal of the sixth transistor $T_6$, and thus, a voltage at the gate terminal of the sixth transistor $T_6$ is not floated, and the sixth transistor $T_6$ may be reliably turned off. In summary, the third transistor $T_3$, the fourth transistor $T_4$, and the fifth transistor $T_5$ are in a turned-on state, but the sixth transistor $T_6$ is in a turned-off state. Accordingly, the driving current $I_2$ flows only through the first driving unit 11, and the driving current $I_2$ does not flow through the second driving unit 12. The current applied to the emitter LED becomes "$I_{Total}=I_1$."

As briefly mentioned above, in the first mode, a logic high signal is input as the display mode selection signal $V_{MODE}$. Thus, while operating in the first mode, the current of "$I_{Total}=I_1+I_2$" may be applied to the emitter LED. In addition, in the second mode, a logic high signal and a logic low signal may be input as the display mode selection signal $V_{MODE}$. Thus, while operating in the second mode, the current of "$I_{Total}=I_1+I_2$" and the current of "$I_{Total}=I_1$" may be applied to the emitter LED. When physical properties of the transistors constituting the first driving unit 11 and physical properties of the transistors constituting the second driving unit 12 are the same, the same reference voltage $V_{REF}$ is applied to the first driving unit 11 and the second driving unit 12, and thus "$I_1=I_2$." Accordingly, the first mode is a mode in which the same current of "$I_{Total}=2I_1$" flows without changing the amount of current for a predetermined period of time. In addition, the second mode is a mode in which the same current of "$I_{Total}=2I_1$" flows for a predetermined period of time, and then the current of "$I_{Total}=I_1$" flows again for a predetermined period of time, that is, the amount of current changes. A basic principle of a display operating in two definition modes (low definition/high definition) may be provided by using the characteristics of the first mode and the characteristics of the second mode.

Meanwhile, the sub-pixel driving circuit 10 according to the present specification may be one component of a sub-pixel circuit.

Figure 4:
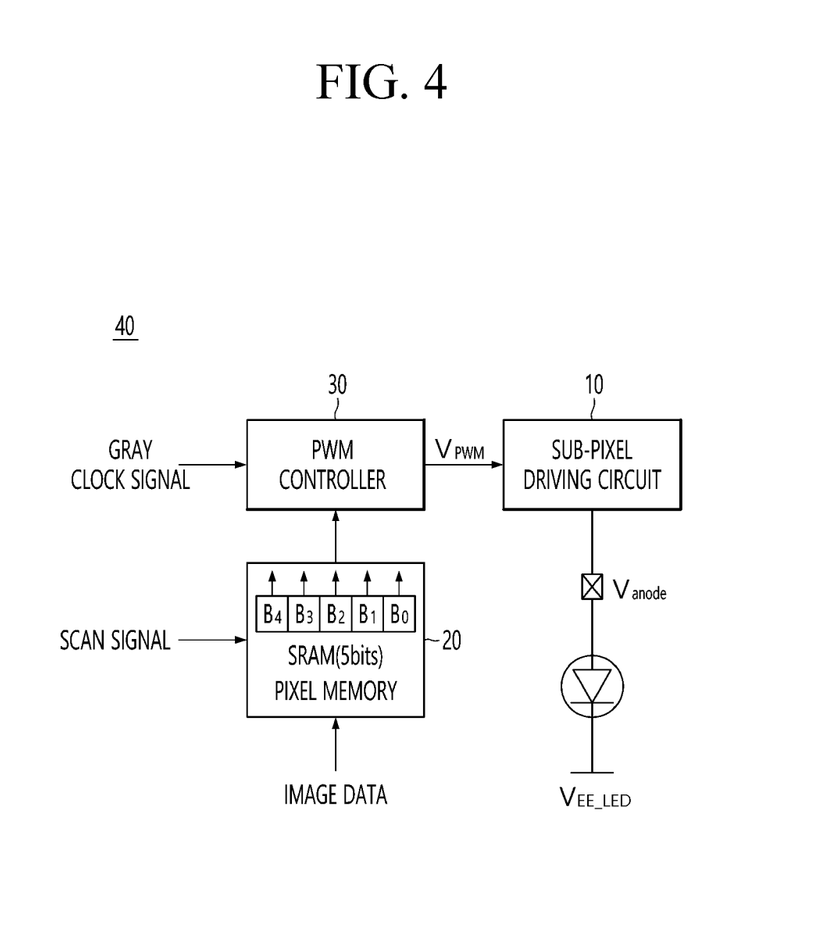
FIG. 4 is a block diagram schematically illustrating a configuration of a sub-pixel circuit according to the present specification.

FIG. 4 is a block diagram schematically illustrating a configuration of a sub-pixel circuit according to the present specification.

Referring to FIG. 4, a sub-pixel circuit 40 according to the present specification may include the sub-pixel driving circuit 10, the emitter LED, a pixel memory 20, and a PWM controller 30.

Since the sub-pixel driving circuit 10 has been described with reference to FIGS. 1 to 3, a repetitive description thereof will be omitted.

The emitter LED may be an LED. The LED may be red (R), green (G), blue (B), or white (W) and may have other various colors. In addition, the LED may be a micro-LED (in general, an LED having a width of 1 μm to 100 μm) or an organic LED (OLED). The sub-pixel circuit 40 according to the present specification is not limited by the type of the emitter.

The pixel memory 20 may store data related to the driving of the emitter LED. The PWM controller 30 may process signals for controlling the luminance of the emitter LED. The sub-pixel circuit 40 according to the present specification is a memory-in-pixel (MIP) pixel having a memory therein, and is a sub-pixel used in an active-matrix display panel that emits light of an emitter with luminance according to data stored in a pixel memory for one frame. In this case, the luminance of the sub-pixel is controlled by a PWM signal, and a PWM control algorithm is a technique known to those skilled in the art, and thus a detailed description thereof will be omitted.

According to an embodiment of the present specification, the pixel memory 20 may include five static random-access memory (SRAM) cells for storing 5 bits of data related to the driving of the emitter LED. A color depth of a display may depend on the number of bits of the pixel memory. Generally, a 256-color display that is widely used is a case in which the pixel memory is 8 bits in size. A 16-bits memory may be used for high resolution, and a 10-bits memory may also be used for gamma correction that occurs at an 8-bits memory. In the present specification, a display panel that uses a 5-bits memory, which is half the memory of a display panel that uses a 10-bits memory, will be described as an example. Even with a half-sized memory, how to realize the same definition as a display panel that uses a 10-bits memory and how to minimize power consumption will be described.

Figure 5:
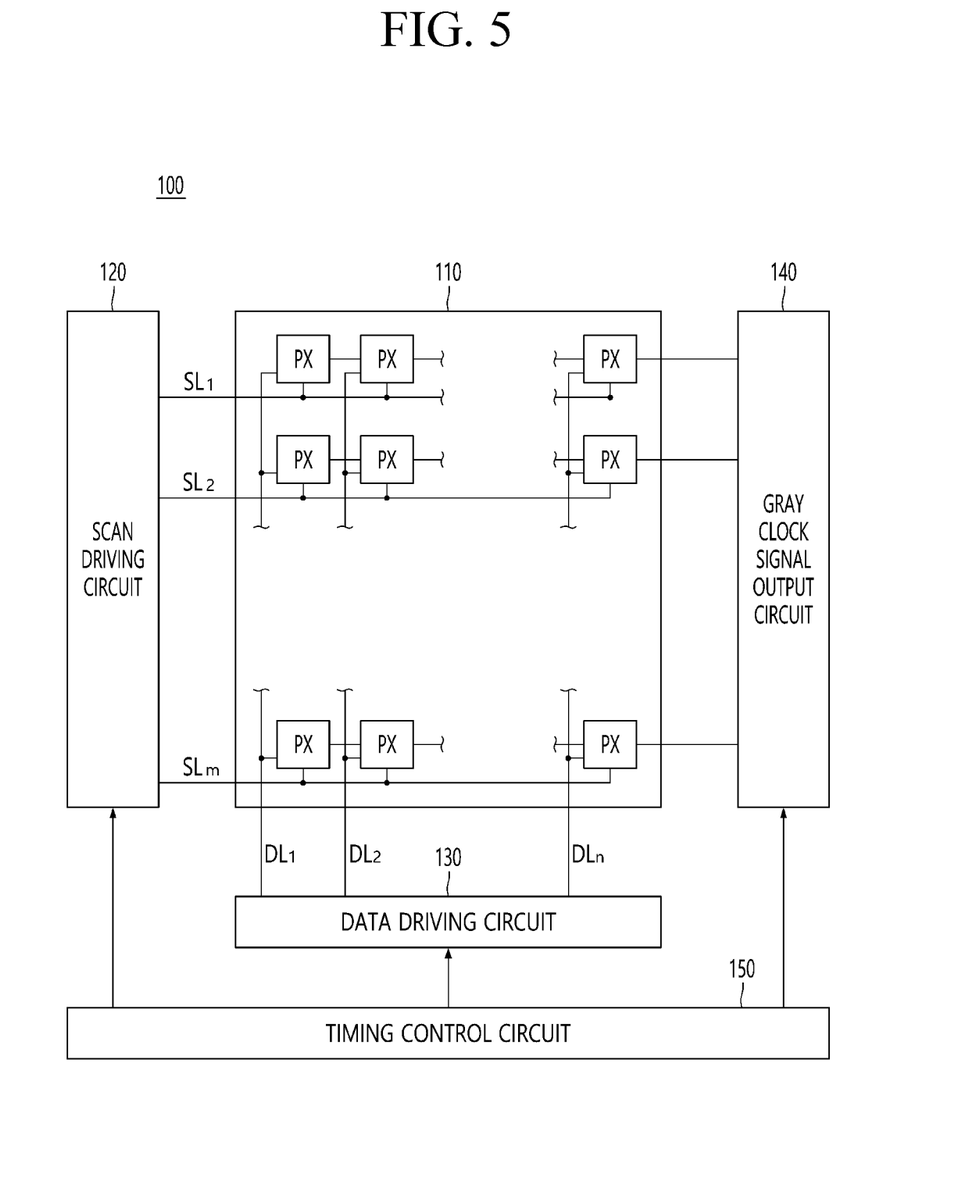
FIG. 5 is a block diagram schematically illustrating a configuration of a display device according to an embodiment of the present specification.

FIG. 5 is a block diagram schematically illustrating a configuration of a display device according to an embodiment of the present specification.

Referring to FIG. 5, a display device 100 according to the present specification may include a display panel 110, a scan driving circuit 120, a data driving circuit 130, a gray clock signal output circuit 140, and a timing control circuit 150.

The display panel 110 may include a plurality of sub-pixel circuits 40 according to the present specification. Three or four sub-pixel circuits 40 may be grouped together to constitute one pixel PX. A plurality of pixels PX may be provided as m×n pixels PX arranged in a matrix form (wherein m and n are natural numbers). However, the plurality of pixels may be arranged in various patterns having a zigzag form and the like according to embodiments.

The display panel 110 may be implemented as one of a liquid crystal display (LCD), an LED display, an OLED display, an active-matrix OLED (AMOLED) display, an electrochromic display (ECD), a digital mirror device (DMD), an actuated mirror device (AMD), a grating light valve (GLV), a plasma display panel (PDP), an electro luminescent display (ELD), and a vacuum fluorescent display (VFD) and may be implemented as other types of flat panel displays or flexible display device. In the present specification, an LED display panel will be described as an example.

Each of the pixels PX may include a pixel circuit that drives a plurality of sub-pixels. The pixel circuit may drive a turn-on or turn-off operation of the sub-pixel circuit 40 in response to a control signal output from the scan driving circuit 120 and/or the data driving circuit 130. The sub-pixel circuit 40 may include at least one thin-film transistor, and may be implemented as a stacked structure on a semiconductor wafer.

The display panel 110 may include scan lines $SL_1$ to $SL_m$ arranged in a row direction and data lines $DL_1$ to $DL_n$ arranged in a column direction. The pixels PX may be positioned at intersections between the scan lines $SL_1$ to $SL_m$ and the data lines $DL_1$ to $DL_n$. Each of the pixels PX may be connected to any one scan line $SL_k$ and any one data line $DL_k$. The scan lines $SL_1$ to $SL_m$ may be connected to the scan driving circuit 120, and the data lines $DL_1$ to $DL_n$ may be connected to the data driving circuit 130.

The scan driving circuit 120 may sequentially drive the sub-pixel circuits arranged in the row direction among the plurality of scan lines connected to the pixel memory of each sub-pixel circuit through the scan lines $SL_1$ to $SL_m$. For example, the pixels connected to a first scan line $SL_1$ may be driven during a first scan driving time, and the pixels connected to a second scan line $SL_2$ may be driven during a second scan driving time. The operation of the scan driving circuit 120 according to the present specification will be described in more detail below.

The data driving circuit 130 may output a signal (a signal related to gradation) related to the driving of each emitter to each pixel memory through the data lines $DL_1$ to $DL_n$ that are connected to the pixel memory of each sub-pixel circuit through the plurality of data lines. One data line may be connected to the plurality of pixels in a vertical direction, but the signal related to the gradation may be input only to the pixels connected to the scan line selected by the scan driving circuit 120

The gray clock signal output circuit 140 may output a pulse signal (hereinafter referred to as "gray clock signal"), whose width is adjusted to adjust the luminance of the sub-pixel, to the PWM controller 30 included in each sub-pixel circuit.

The timing control circuit 150 may output signals for controlling the scan driving circuit 120, the data driving circuit 130, and the gray clock signal output circuit 140. Operation algorithms of the timing control circuit 150, the scan driving circuit 120, the data driving circuit 130, and the gray clock signal output circuit 140 are well known to those skilled in the art, and thus detailed descriptions thereof will be omitted. Unlike the conventional display device, the timing control circuit 150 may output the display mode selection signal $V_{MODE}$ to the second transistor $T_2$ included in each of the plurality of sub-pixel circuits 40.

According to an embodiment of the present specification, the display mode selection signal $V_{MODE}$ may be a first mode signal for the standard-definition mode and a second mode signal for the high-definition mode. As used herein, the "high-definition mode" refers to a definition having a color depth that is relatively greater than that of the standard-definition mode.

Figure 6A:
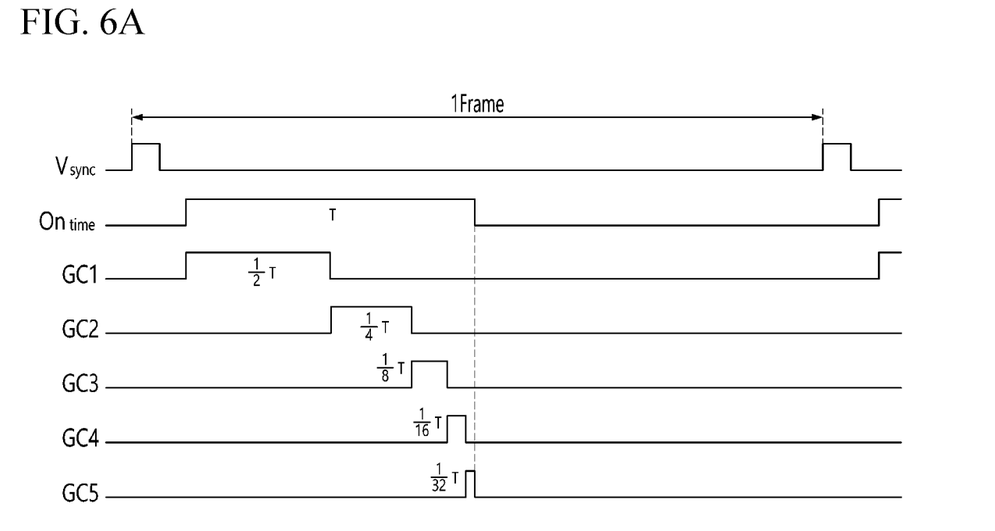
FIGS. 6A and 6B are reference diagrams of the time during which an emitter emits light according to a first mode and a second mode.
Figure 6B:
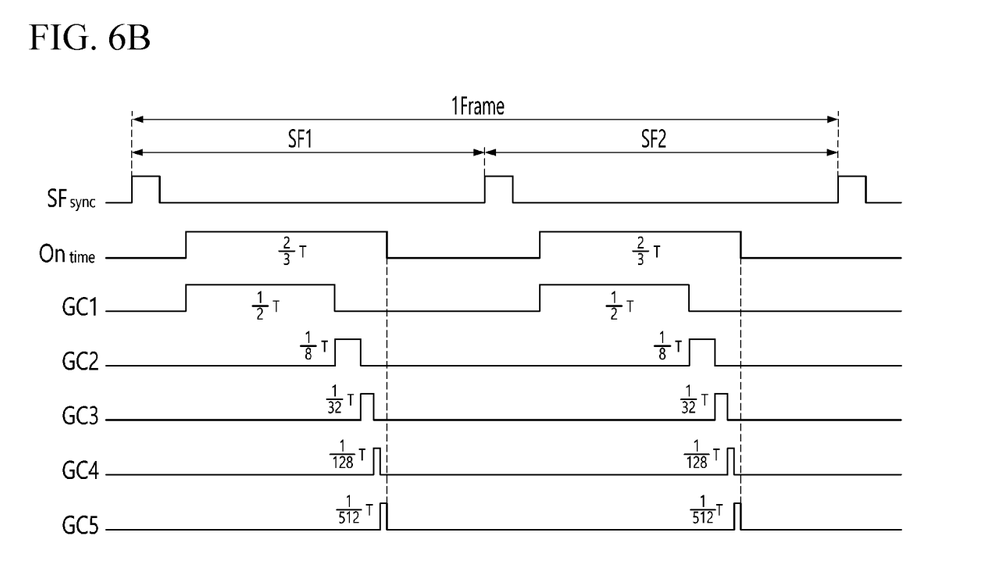

FIGS. 6A and 6B are reference diagrams of the time during which the emitter emits light according to the first mode and the second mode.

FIG. 6A is a timing diagram related to the operation time (On time) of the emitter in the first mode (standard-definition mode), and FIG. 6B is a timing diagram related to the operation time (On time) of the emitter in the second mode (high-definition mode).

The first mode and the second mode may have the same frame period. At this point, the second mode may include two sub-frames SF included in one frame. The two sub-frames SF will be referred to as a first sub-frame SF1 and a second sub-frame SF2, respectively.

In the first mode, which is the standard-definition mode, the timing control circuit 150 according to the present specification may output the display mode selection signal $V_{MODE}$ so that the second transistor $T_2$ is turned on in one frame period. In addition, in the second mode, which is the high-definition mode, the timing control circuit 150 according to the present specification may output the display mode selection signal $V_{MODE}$ so that the second transistor $T_2$ is turned on in one sub-frame (e.g., SF1) period of the two sub-frames included in one frame and the second transistor $T_2$ is turned off in the remaining sub-frame (e.g., SF2) period.

Further, in the first mode, the timing control circuit 150 may output a control signal to the gray clock signal output circuit 140 so that the gray clock signal output circuit 140 outputs gray clock signals GC1 to GC5 for a predetermined period of time T. In addition, in the second mode, the timing control circuit 150 may output a control signal to the gray clock signal output circuit 140 so that the gray clock signal output circuit 140 outputs the gray clock signals GC1 to GC5 during "⅔T" in each sub-frame period. For reference, when all of the gray clock signals GC1 to GC5 are summed, the sum becomes the operation time (On time) of the emitter.

A quantity of electric charge Q, which flows to the emitter LED for one frame in the first mode (standard-definition mode) and the second mode (high-definition mode) by a control algorithm of the timing control circuit 150, will be described. First, in the first mode, the second transistor $T_2$ is turned on, and thus a current flowing through the emitter LED is "$2I_1$." In addition, in the first mode, the operation time (On time) of the emitter LED is "T." Thus, in the first mode, the quantity of electric charge Q flowing to the emitter LED for one frame is "$2I_1*T$." On the other hand, in the second mode, the operation time (On time) of the light-emitting element LED in the first sub-frame period is "⅔T," and a current flowing through the emitter LED is "$2I_1$." In the second mode, the operation time (On time) of the emitter LED in the second sub-frame period is "⅔T," and a current flowing through the emitter LED is "$I_1$." Thus, in the second mode, the quantity of electric charge Q flowing to the emitter LED for one frame is "$(2I_1*⅔T)+(I_1*⅔T)=2I_1*T$." That is, the quantity of electric charge Q flowing to the emitter LED for one frame is the same in the first mode and the second mode. However, in the second mode, that is, in the high-definition mode, more diverse luminance may be expressed through two sub-frames SF, so that an image with greater color depth may be output. In other words, both low- and high-definition images may be expressed using the same pixel memory 20.

To this end, in the first mode, the timing control circuit 150 may output a control signal so that the gray clock signal output circuit 140 outputs the gray clock signals GC1 to GC5, which satisfies $$\sum_{n=1}^{k} \frac{1}{2^n} T$$

(where k is the number of pixel memory storage bits). In addition, in the second mode, the timing control circuit 150 may output a control signal so that the gray clock signal output circuit 140 outputs the gray clock signals GC1 to GC5, which satisfies $$\sum_{n=1}^{k} \frac{1}{2^{2n-1}} T$$

(where k is the number of pixel memory storage bits).

Further, in the first mode, the timing control circuit 150 may output a control signal so that the data driving circuit 130 outputs a signal related to the driving of each emitter to each pixel memory 20 once. In addition, in the second mode, the timing control circuit 150 may output a control signal so that the data driving circuit 130 outputs a signal related to the driving of each emitter to each pixel memory 20 twice in response to each sub-frame period.

The display device 100 according to the present specification may display both low- and high-definition images by using the pixel memory 20 of the same size, and also, allow manufacturing costs of a display panel to be reduced. For example, when a display panel with a pixel circuit having a memory cell of 5 bits, which is half as compared to manufacturing a conventional display panel with a pixel circuit having a memory cell of 10 bits. is manufactured, it is obvious that costs are reduced. In addition to the costs, a manufacturing process of the display panel may be further simplified.

Further, low-power driving may be achieved depending on the environment in which the display device is used. For example, assuming the environment in which a high-definition image is mostly output and a high-definition image needs to be output occasionally. It is not necessary to design the memory to be excessively large in order to output the high-definition image, which is relatively occasionally used, and of course, it may also prevent unnecessary power consumption. Accordingly, it is possible to use the display device more efficiently in an environment in which power supply to the display device is limited.

The environment in which power supply to the display device is limited includes a case of, for example, a portable device in which power is supplied through a battery. In particular, the display device 100 according to the present specification may be more efficient in an environment, in which the size or weight of a battery is particularly limited, such as a wearable device.

Figure 7:
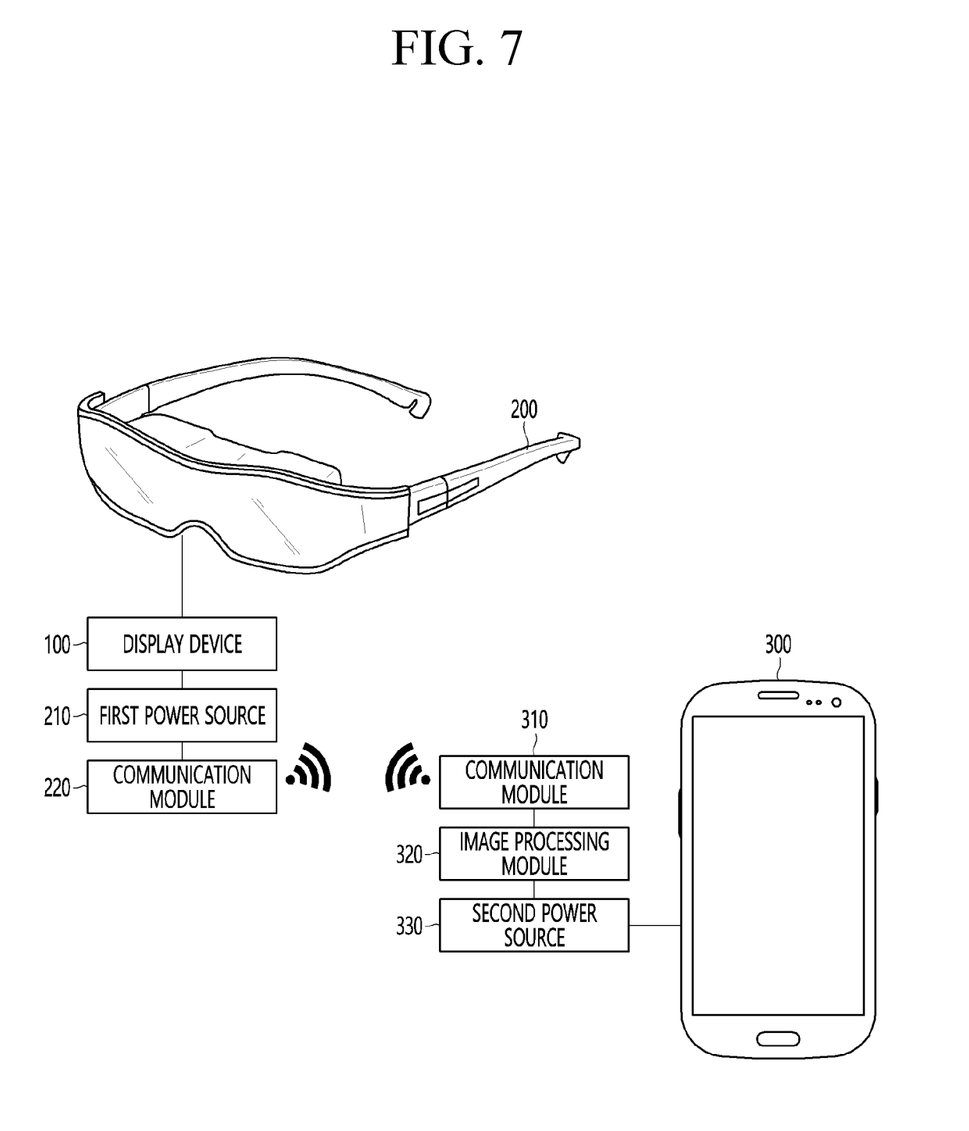
FIG. 7 is an exemplary diagram of a wearable device including a display device (100) according to the present specification.

FIG. 7 is an exemplary diagram of a wearable device including the display device 100 according to the present specification.

Referring to FIG. 7, it can be seen that a wearable device, so-called smart glasses, that can be worn on the face of a person like glasses is illustrated. The smart glasses are a wearable device and thus have a limitation of being driven by a battery. In particular, when compared to a wearable device wearable on the wrist, the waist, or the like, the smart glasses need to be worn on the face and thus have many restrictions on the size and weight of the battery. At the same time, the smart glasses need to provide information to a user on a screen through a display device, and thus, require a large amount of power as compared to other wearable devices.

Accordingly, power consumption may be efficiently controlled by allowing the display device to operate in the first mode according to the present specification when sufficient information can be provided to the user even when outputting a low-definition image, and to operate in the second mode according to the present specification when a high-definition image is required, in consideration of the characteristics of information displayed on the screen.

Figure 8A:
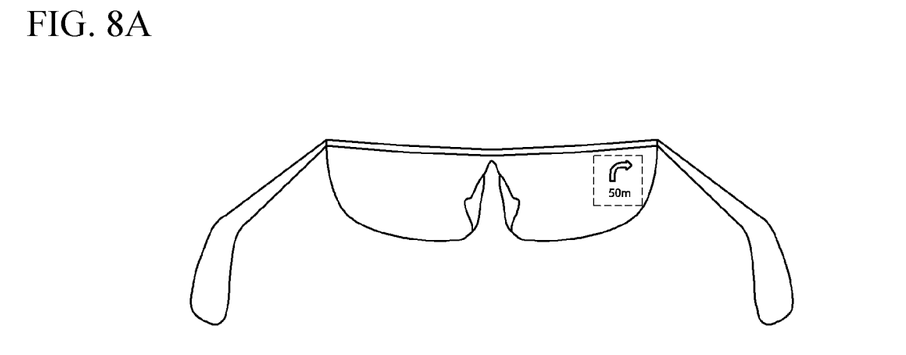
FIGS. 8A and 8B are exemplary situation diagrams of smart glasses operated in the first mode and the second mode.
Figure 8B:
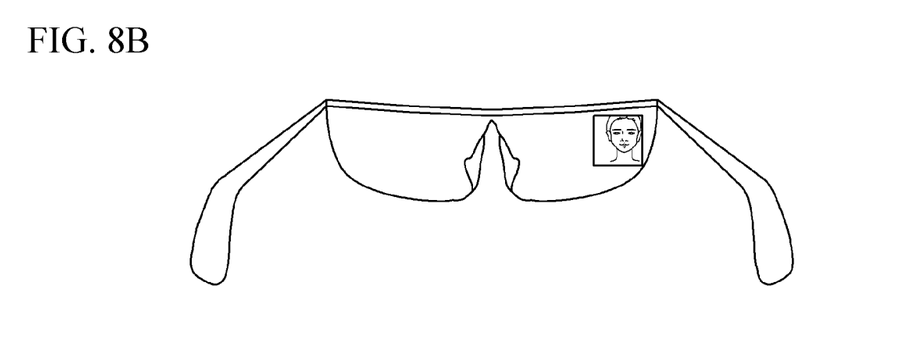

FIGS. 8A and 8B are exemplary situation diagrams of smart glasses operated in the first mode and the second mode.

FIG. 8A illustrates a situation in which the smart glasses provide navigation information. In the case of navigation information, a change amount between frames is not large and the information may be sufficiently provided even when a color depth of the information displayed by pixels is not relatively great. Thus, in this case, the display device may operate in the first mode. On the other hand, FIG. 8B illustrates a situation in which the smart glasses output a picture or a video. In the case of a picture, unlike the navigation, a high-definition image is required. Thus, in this case, the display device may operate in the second mode.

Referring to FIG. 7 again, a wearable device 200 according to the present specification may include the display device 100, a first power source 210 configured to supply power to the display device 100, and a communication module 220 configured to receive data (hereinafter, referred to as "image data") related to an image displayed on the display device 100 from a host device 300, which transmits the image data, and provide the image data to the timing control circuit 150.

Since the display device 100 included in the wearable device 200 has been described above with reference to FIGS. 6A and 6B, a repetitive description thereof will be omitted. The communication module 220 is a configuration to transmit and receive data to and from the host device 300, and may receive image data through wireless communication. The wireless communication is illustrated as an example in the drawings, but the present disclosure is not necessarily limited to the wireless communication, and wired communication is also possible. In addition, the first power source 210 is a name for distinguishing the first power source 210 from a second power source 330 included in the host device 300, and may include a variety of power sources including a secondary battery. Accordingly, the host device 300 may receive power from the second power source 330.

Meanwhile, in FIG. 7, the host device 300 is illustrated as being a smart phone, but the host device 300 may be a laptop computer, a digital broadcasting terminal, a personal digital assistant (PDA), a portable multimedia player (PMP), a navigation device, a slate personal computer (PC), a tablet PC, and an ultrabook in addition to the smart phone.

Further, the host device 300 may include an image processing module 320. In order to output a screen in a display device, various pre-processing operations may be required. For example, operations such as de-mura, dead pixel compensation, and gamma correction are required, and a storage space for storing the image, on which the above operation completely performed, in a frame buffer is also required. In addition, since the display device according to the present specification has the first mode and the second mode, an operation of converting an input image into image data according to the first mode or the second mode may be required. For this operation, an image data processing processor with higher performance may be required and may consume a large amount of power. Accordingly, the display device 100 may be designed to use a minimum amount of power by allowing an operation until the timing control circuit 150 generates the image data at a level that can be directly provided to the data driving circuit 130 to be processed by the image processing module 320 included in the host device 300.

Meanwhile, the timing control circuit 150 may control the overall operation of the display device 100 in addition to the control operations described herein. For example, in addition to the image data (RGB data), the timing control circuit 150 may receive a horizontal synchronization signal $H_{sync}$, a vertical synchronization signal $V_{sync}$, a clock signal CLK, and a data enable signal DE from the host device 300, and may control the scan driving circuit 120, the data driving circuit 130, and the gray clock signal output circuit 140 on the basis of the received signals.

In order to execute the control operations and various control logic described above, the timing control circuit 150 may include a processor, an application-specific integrated circuit (ASIC), other chipsets, a logic circuit, a register, a communication modem, a data processing device, and the like known in the technical field to which the present disclosure pertains. In addition, when the control logic described above is implemented in software, the timing control circuit 150 may be implemented in a set of program modules. In this case, the program module may be stored in a memory device and executed by the processor.

The computer program may include a code encoded in a computer language such as C/C++, C#, JAVA, Python, a machine language, or the like that may be read by a processor (CPU) of a computer through a device interface of the computer in order to cause the computer to read the program and execute the methods implemented in the program. Such a code may include functional codes related to functions or the like that define the necessary functions for executing the methods and include control codes related to the execution procedures necessary to cause the processor of the computer to execute the functions in a predetermined procedure. In addition, the code may further include a memory reference-related code for additional information or media necessary to cause the processor of the computer to perform the functions as to which location (address) of the computers internal or external memory should be referenced. Further, when the processor of the computer needs to communicate with any other computers or servers remotely to perform the functions, the code may further include a communication-related code as to whether how to communicate with any other computers or servers remotely using the communication module of the computer or which information or media should be transmitted or received during communication.

The stored medium is not a medium for storing data for a short time, such as a register, a cache, or a memory and refers to a medium which semi-permanently stores data and is capable of being read by a device. Examples of the stored medium include read-only memories (ROMs), random-access memories (RAMS), compact disc ROMs (CD-ROMs), magnetic tapes, floppy disks, and optical data storage devices, but the present disclosure is not limited thereto. That is, the program may be stored in various recording media used for various servers accessible by the computer, or on various recording media used for the user's computer. In addition, the medium may be distributed over a network-connected computer system, and a computer-readable code may be stored in a distributed manner.

Although the embodiments of the present disclosure have been described with reference to the accompanying drawings, it should be understood that those skilled in the art can carry out other modifications without changing the technical spirit or essential features of the present disclosure. Therefore, it should be understood that the embodiments described herein are illustrative and not restrictive in all aspects.

DESCRIPTION OF REFERENCE NUMERALS

| | |
|---|---|
| 10: sub-pixel driving circuit | 12: second driving unit |
| 11: first driving unit | 30: PWM controller |
| 20: pixel memory | 100: display device |
| 40: sub-pixel circuit | 120: scan driving circuit |
| 110: display panel | 140: gray clock signal output circuit |
| 130: data driving circuit | |
| 150: timing control circuit | |

The invention claimed is:

1. A pixel driving circuit comprising:
a driving line configured to connect between an output of a first transistor and a positive power source or between the output of the first transistor and a negative power source;
the first transistor connected in series on the driving line and turned on in response to a pulse width modulation (PWM) signal;
a first driving unit and a second driving unit that are connected in series from the driving line to a light emitting diode and electrically connected in parallel to each other; and
a second transistor connected between a reference voltage source and the second driving unit, wherein the reference voltage source is configured to apply a reference voltage to the first driving unit and the second driving unit,
wherein when operating in a first display mode, the first and second driving unit are turned on, and
when operating in a second display mode, the first driving unit is turned on for a cyclic period comprising first and second portion periods, and the second transistor is configured to turn on the second driving unit for the first portion period and turn off the second driving unit for the second portion period,
wherein the second display mode has a higher resolution than the first display mode, wherein the first driving unit includes:
- a third transistor connected in series on the driving line and turned on in response to the positive power source; and
- a fourth transistor connected in series on the driving line and turned on in response to the reference voltage, and the second driving unit includes:
- a fifth transistor connected in series on the driving line and turned on in response to the positive power source; and
- a sixth transistor connected in series on the driving line and turned on in response to the reference voltage when the second transistor is turned on.

2. The pixel driving circuit of claim 1, wherein the second transistor is connected between the reference voltage source and the sixth transistor.

3. The pixel driving circuit of claim 1, further comprising a seventh transistor connected between the positive power source and the sixth transistor, wherein the seventh transistor is turned on or off in response to a display mode selection signal.

4. The pixel driving circuit of claim 3, wherein the first, fourth, sixth, and seventh transistors are P-type metal-oxide silicon field effect transistors (MOSFETs), and the second, third, and fifth transistors are N-type MOSFETs.

5. A pixel circuit comprising:
the pixel driving circuit of claim 1;
an emitter;
a pixel memory configured to store data related to driving of the emitter; and
a pulse width modulation (PWM) controller configured to process a signal for controlling luminance of the emitter.

6. The pixel circuit of claim 5, wherein the pixel memory includes five static random-access memory (SRAM) cells for storing 5 bits of data related to the driving of the emitter.

7. The pixel driving circuit of claim 1, wherein
the first display mode is a standard-definition mode, and
the second display mode is a high-definition mode.

\* \* \* \* \*